April 27, 1965     T. DZUS ETAL     3,180,387

FLOATING FASTENER RECEPTACLE

Filed Oct. 22, 1962

INVENTOR.
THEODORE DZUS
CONRAD J. GUNTHER
BY

ATTORNEYS 3,180,387
FLOATING FASTENER RECEPTACLE
Theodore Dzus, West Islip, and Conrad J. Gunther, Hempstead, N.Y., assignors to Dzus Fastener Co. Inc., West Islip, N.Y., a corporation of New York
Filed Oct. 22, 1962, Ser. No. 232,025
1 Claim. (Cl. 151—41.73)

This invention relates to an improved floating fastener receptacle.

Quick-acting fasteners of the threaded and unthreaded type are employed in many different installations where it is desired to repeatedly separate parts or to obtain quick access to a covered area. Such quick-acting fasteners generally comprise a stud member and a receptacle member interengageable with each other. The stud member is generally mounted on the detachable member and the receptacle member is generally mounted on the fixed support. For proper functioning of the fasteners it is important that the stud member and receptacle member be positioned in substantial alignment with each other. Difficulty is frequently encountered with misalignment of the fastener parts resulting from cumulative manufacturing tolerances, careless installation or shifting or distortion of the parts after installation. For this reason it has been proposed to provide a floating mounting for fastener receptacles.

The floating fastener receptacles heretofore available have presented difficulties and disadvantages. Thus, certain of the floating fastener receptacles have been unduly cumbersome, complicated and expensive to manufacture, use and install. Other floating fastener receptacles have not presented a truly universal floating movement. Still other floating fastener receptacles have presented the difficulty that rotation of the fastener parts relative to each other on locking of the fastener has resulted in a camming action inducing misalignment in the receptacle member. Furthermore, many floating fastener receptacles have been difficult and expensive to install.

It is an object of the present invention to overcome the difficulties and disadvantages heretofore encountered and to provide an improved floating fastener receptacle which is of relatively simple and inexpensive construction, which is relatively easy to install and to use and which provides a truly universal floating movement whereby the receptacle can be shifted into proper alignment with the fastener stud and will remain properly aligned upon rotation of the fastener parts in locking the fastener.

Our invention contemplates the provision of a floating fastener receptacle having an annular mounting base with an upstanding retaining flange having equally spaced pairs of diametrically opposite slots formed therein and an annular fastener portion mounted on the base portion and having a corresponding number of equally spaced pairs of diametrically opposite guide arms disposed in the guide slots of the base portion.

Figure 3:
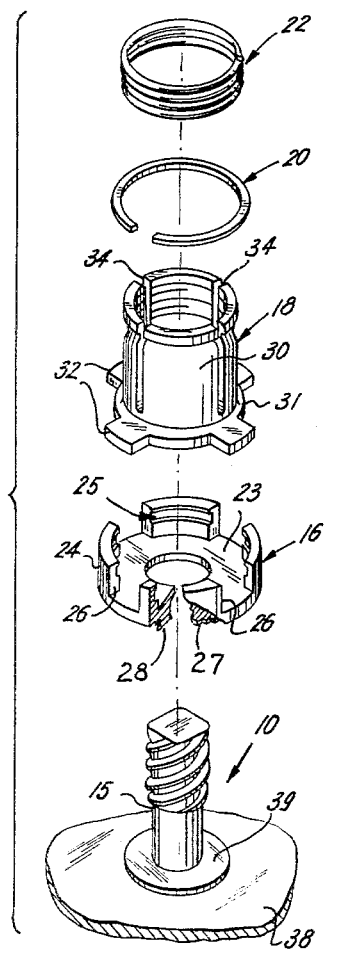

Our invention is shown as embodied in one known type of quick-acting fastener assembly; however, it should be understood that our invention is equally applicable to other types of threaded or unthreaded quick-acting fastener assemblies.

The illustrated fastener assembly comprises a stud member 10 which engages with a receptacle member 12 embodying our invention. The stud member is of one conventional design and comprises a head portion 14 and a shank portion 15. The head portion has provision to be engaged by a tool and in the illustrated embodiment is of hexagonal shape so that it can be operated by a wrench. The shank portion 15 is of smaller diameter and unthreaded adjacent the head as shown and the outer portion thereof is threaded. The fastener is of the quick-acting type and the illustrated embodiment of the stud member is provided with four lead threads of relatively steep pitch.

The receptacle member is formed of a mounting base 16, a fastener portion 18, a split assembly ring 20 for holding the mounting base and fastener portion in assembled relationship and a helical spring 22 adapted to encircle the fastener portion.

The mounting base 16 is formed with a disc shaped portion 23 having a central aperture of a size to accommodate the threaded shank portion 15 of stud member 10. Extending upwardly around the periphery of the base is a retaining flange 24 having a retaining groove and shoulder 25 extending around its inner surface near the outer end thereof. The retaining flange is divided into a plurality of segments by means of diametrically opposite guide slots 26. Extending downwardly from the lower surface of the disc portion 23 is a depending attaching flange having a toothed ring 27 of relatively larger diameter disposed immediately adjacent the disc portion and a recessed ring and attaching shoulder 28 adjacent its outer or free end. The illustrated attaching means represents a pressed or friction fit type of attachment and serves very satisfactory because of the simplicity of installation, the small amount of space required and the security and reliability of the mounting resulting therefrom.

The fastener portion 18 comprises an upstanding cylindrical collar 30 having a laterally projecting flange 31 at its lower end formed with radial guide arms 32 corresponding in arrangement with the guide slots 26 in the mounting base. In the illustrated embodiment we have provided four equally spaced guide slots and guide arms. The flange 31 of the fastener portion is adapted to rest on the mounting base inside the retaining flange 24 with the guide arms 32 disposed in the guide slots 26. The inside diameter of the retaining flange 24 is larger than the outside diameter of the flange 31 on the fastener portion. In addition the guide arms 32 are of smaller width than the slots 26. Thus, when the fastener portion is assembled with the mounting base in the manner described above it may have universal floating motion in all lateral directions with respect thereto.

Figure 1:
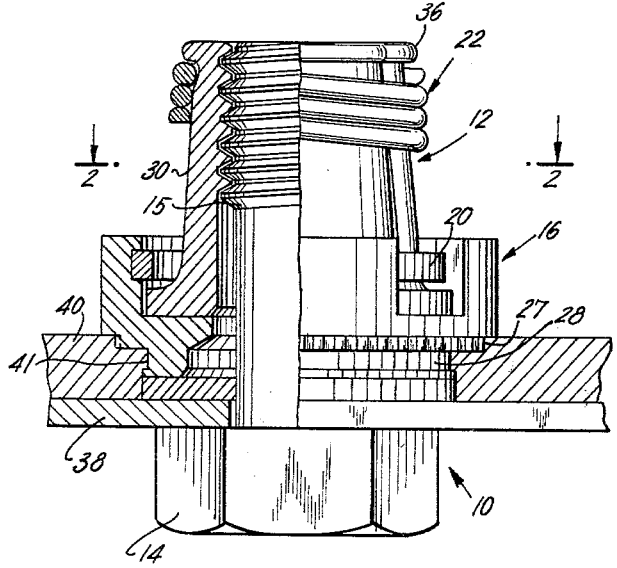
FIG. 1 is an elevational view partially in section of a fastener assembly having a receptacle portion embodying our invention.
Figure 2:
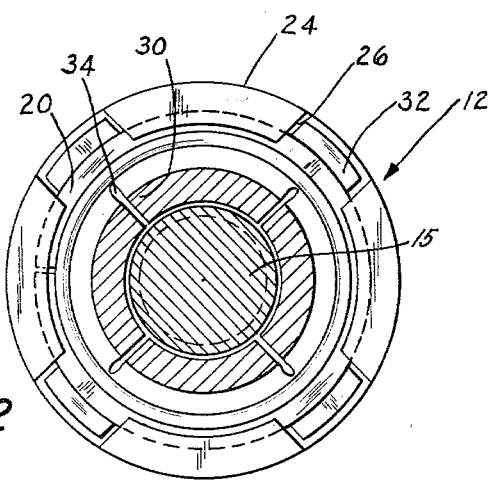
FIG. 2 is a cross sectional view of the assembly in the direction of the arrows on the line 2—2 of FIG. 1; and, FIG. 3 is an exploded view showing the component parts of the fastener assembly.

The fastener portion is retained in assembled relationship with respect to the mounting base by means of the split retaining ring 20. The retaining ring 20 is made of a suitable resilient material such as spring steel, beryllium copper, bronze or the like. As illustrated in FIG. 3 it is split in one portion of the circumference thereof whereby it can be expanded and contracted. The normal unstressed diameter of the split retaining ring is slightly larger than that of the retaining groove 25 in the retaining flange of the mounting base. Accordingly the ring can be temporarily compressed and inserted into the retaining groove after the fastener portion has been assembled with the mounting base to retain the parts in assembled relationship as clearly shown in FIGS. 1 and 2. When thus assembled it will be seen that the split retaining ring is disposed above the flange 31 and guide arms 32 of the fastener portion and separation of the parts is thereby prevented. However, it will be seen that the fastener portion is free to shift or float with respect to the mounting base because the outside diameter of the collar portion 30 is less than the inside diameter of the retaining ring 20.

The collar 30 of the fastener portion is internally threaded with threads that are complementary with the threads of the stud member so the stud member can be interengaged and released from the fastener portion by rotation relative to the fastener portion. The fastener portion is preferably of the self-locking type and for this purpose it may be provided with longitudinal slots 34 dividing the collar into resilient segments. The intermediate portion of the threaded area of the collar is preferably compressed inwardly to exert a chucking or gripping action on the thread shank of the stud when it is engaged therewith. The helical spring 22 is preferably assembled around the exterior of the collar so as to urge the collar into the semi-compressed relationship and to augment the chucking action. The normal unstressed diameter of the helical spring is such as to exert a compressive force on the collar. To assemble the spring around the collar it is temporarily expanded and ensleeved over the collar and permitted to resume its normal diameter. A retaining bead 36 may be provided around the upper end of the collar to retain the spring in place.

In using our improved fastener assembly the stud member is first assembled with a plate cover, panel or other removeable part indicated at 38 by forming an aperture in the plate large enough to permit the insertion of the shank portion of the stud member. A retaining washer 39 is then assembled around the unthreaded portion around the shank of the stud so as to permit rotation of the stud while retaining it captive. The receptacle member is assembled with a supporting plate 40 as by drilling an aperture therein in alignment with the aperture in the plate 38 large enough to accommodate the attaching shoulder 28 at the lower end of the attaching flange. The attaching flange is then driven downwardly into the aperture so that the toothed ring 27 is embedded in the surface of the plate 40 upsetting and forming the material of the plate and causing it to flow into the recessed ring adjacent the attaching shoulder as shown at 41. The interengagement of the plate 40 with the attaching shoulder and recessed ring as shown at 41 retains the receptacle member assembled with the plate. The toothed ring 27 retains the receptacle member against relative rotation with respect to the plate. In closing the fastener the shank of the stud member is inserted inside the collar 30 of the receptacle member and rotated in clockwise direction to interengage the threads. The self-locking feature will prevent accidental opening of the fastener under conditions of stress or vibration. To open the fastener the stud is simply rotated in counterclockwise direction. If the parts are misaligned due to faulty installation or subsequent deforming of the plates the fastener portion or collar member 30 may be shifted laterally to bring it into proper alignment with the shank of the stud. Due to the fact that the collar has universal floating in all lateral directions with respect to the mounting base misalignment in any direction can thus be corrected.

It will thus be seen that we have provided an improved floating fastener receptacle which is of simple and inexpensive construction; which is relatively easy to install and use; which provides for universal floating adjustment, and which will remain properly aligned upon rotation of the fastener parts in locking the fastener.

Modifications may be made in the illustrated embodiment of the invention without parting from the invention as set forth in the claim.

We claim:

A floating fastener receptacle comprising: an annular mounting base member comprising a disc shaped portion formed with a central aperture and with attaching means in the form of a downwardly depending flange having a ring portion spaced radially inwardly from the outer periphery of said disc portion and provided with radially outwardly projecting external teeth and a recessed ring spaced axially below said teeth and of smaller diameter than said toothed ring terminating in an attaching shoulder at the outer end thereof for mounting the receptacle on a support and having an upstanding retaining flange on the outer periphery of said disc portion concentric with the aperture and with an inwardly projecting retaining groove and shoulder and with two equally spaced pairs of diametrically opposite guide slots extending through and completely interrupting the flange in both a radial and axial direction; a longitudinally slotted, internally threaded and resilient tubular fastener member with the central section of the tubular portion being deformed inwardly and being of lesser diameter than the remainder of the tubular portion, said tubular portion having a radially extending flange portion at one end and situated inside the retaining flange of said mounting base member and formed with two equally spaced pairs of diametrically opposite radial guide arms extending radially beyond said radially extending flange and disposed in the slots of the retaining flange, said radially extending flange portion of said tubular fastener portion having a smaller outside diameter than the inside diameter of the retaining flange and said guide arms being of lesser width than said slots whereby the fastener member has limited universal floating movement relative to the supporting base member; and assembly means in the form of a split resilient retaining ring disposed inside said retaining flange above the guide arms of the fastener member and extending around and spaced from the tubular fastener portion in engagement with the retaining shoulder.

References Cited by the Examiner

UNITED STATES PATENTS

| | | | |
|---|---|---|---|
| 2,144,553 | 1/39 | Simmonds | 85—8.8 |
| 2,353,252 | 7/44 | Leisure | 151—41.76 |
| 2,553,236 | 5/51 | Bratfisch | 85—40 |
| 3,079,970 | 3/63 | Barry | 151—41.73 |

FOREIGN PATENTS 682,498  11/52  Great Britain.

EDWARD C. ALLEN, *Primary Examiner.*